of this invention.

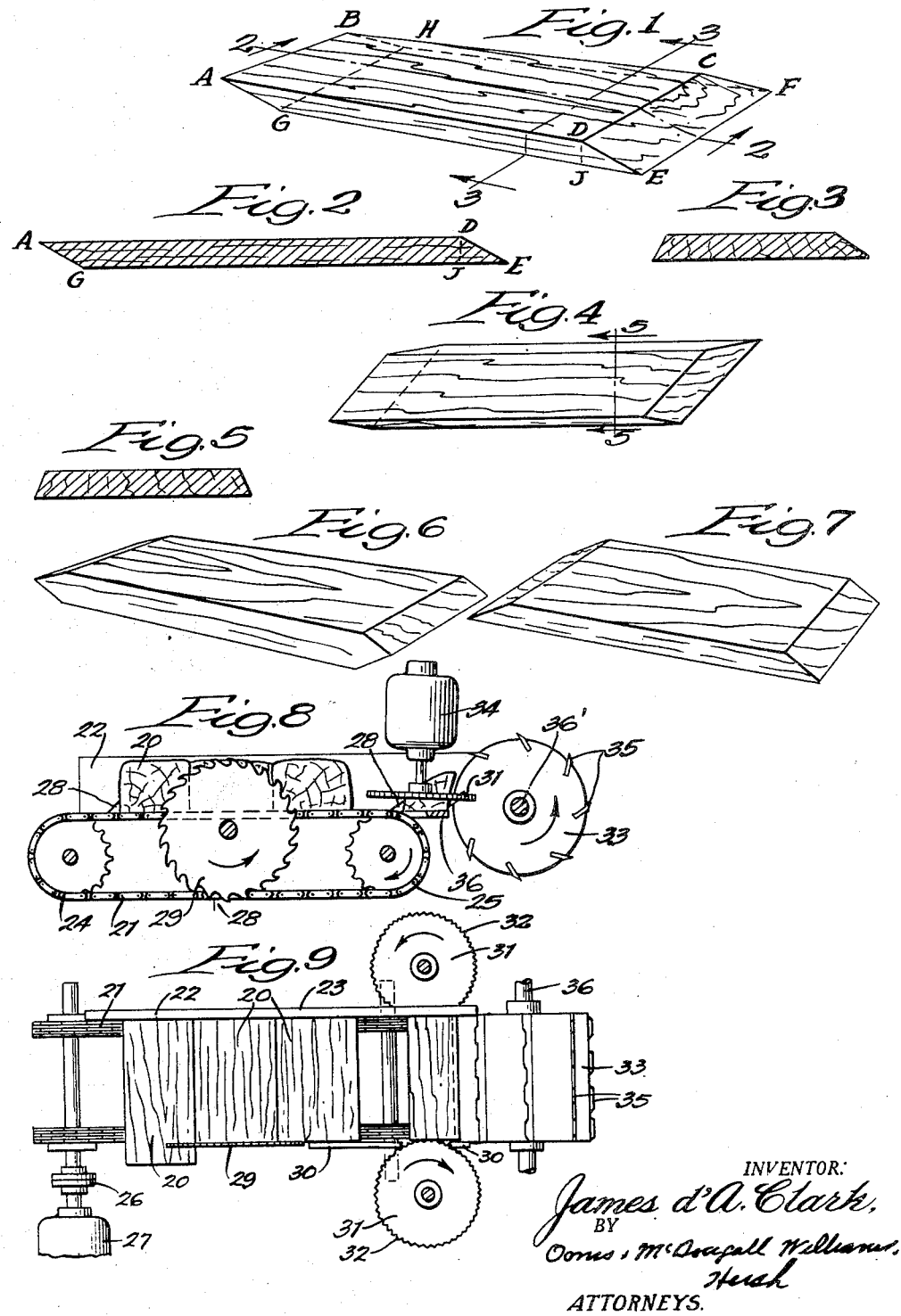

United States Patent Office 2,776,688
Patented Jan. 8, 1957

2,776,688

CROSSCUT FIBER AND METHOD FOR ITS PREPARATION

James d'A. Clark, Victoria, British Columbia, Canada, assignor to Changewood Corporation, Chicago, Ill., a corporation of Illinois Original application March 23, 1953, Serial No. 344,089. Divided and this application July 18, 1956, Serial No. 598,704

5 Claims. (Cl. 144—309)

This invention relates to a new and improved wood particle and it relates particularly to a woody fibrous element and method for manufacturing same, and to a consolidated product manufactured therefrom and method for manufacturing same.

This is a division of my copending application Serial No. 344,089, filed March 23, 1953, and entitled "Crosscut Fiber and Method for its Preparation."

In Patent No. 2,689,092, description is made of the manufacture of a fiber flake or wafer cut crosswise tangentially to the grain of the wood and having end faces formed at right angles to the sides and to the top and bottom faces of the wafer. Unless such flakes or wafers are cut undesirably thin, the abrupt vertical end faces of the wafers cause undesirable zones or lines of weakness throughout the structure molded therefrom. This is particularly evident with harder woods and woods having hard summer wood annual rings, such as are found in Southern Pines. Moreover, on the broad faces of well compacted structures molded therefrom and particularly where the end of one wafer overlaps the face of another, there exists an undesirable linear depression which not only constitutes a line of weakness upon flexure but presents an unattractive appearance and provides a crevice wherein dirt may lodge. The side portions of flakes of this type do not present the same difficulties because the side surfaces are predominantly parallel to the annual rings which are usually at an acute angle to the broad surfaces. Further, by being parallel to the grain, the side faces and edges are more pliable laterally than are the end faces and edges. Consequently the juncture between the side edges and the underlying element does not become obvious nor objectionable in the molded structure.

An object of this invention is to provide an improved wood fiber or flake suitable for manufacturing molded fibrous products.

Another object is to provide fibers or flakes of woody material characterized by their ability to form a smooth, continuous unbroken surface and which become well joined with underlying fibrous elements during molding into a consolidated product.

A further object is to provide a method for producing wafers suitable for forming into strong and attractive consolidated products by the use of brittle woody material, such as kiln dried lumber.

Another object is to provide a method of producing woody flakes or wafers of predetermined thickness and length with ends of the flakes tapered or wedge shaped.

A still further object is to produce a strong consolidated fibrous product of high density having a substantially unbroken surface by the use of woody flakes or wafers advantageously shaped and thinly coated with resinous material.

These and other objects and advantages of this invention will hereinafter appear and for purposes of illustration, but not of limitation, an embodiment of the invention is shown in the accompanying drawings, in which Figure 1 is a perspective view of a woody flake produced in accordance with this invention;

Figure 2 is a sectional view taken along the line 2—2 of Figure 1;

Figure 3 is a sectional view taken along the line 3—3 of Figure 1;

Figure 4 is a plan view of a modified form of flake produced in accordance with this invention;

Figure 5 is a sectional view taken along the line 5—5 of Figure 4;

Figure 6 is a perspective view of a further modification in a woody wafer or flake embodying features of this invention;

Figure 7 is a perspective view showing a still further modification in a flake or wafer embodying features of this invention;

Figure 8 is a schematic side elevational view of an apparatus which may be used in preparing flakes in accordance with this invention;

Figure 9 is a plan view of the apparatus shown in Figure 8;

Figure 12:
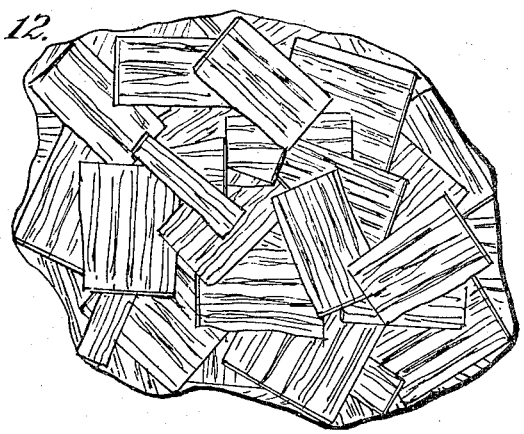
Figure 13:
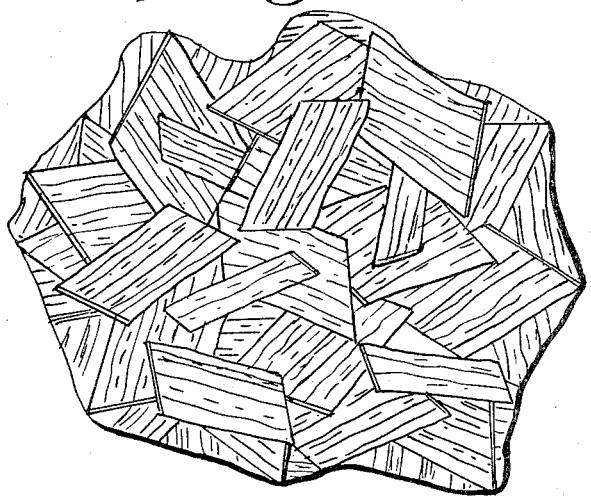
Figure 11:
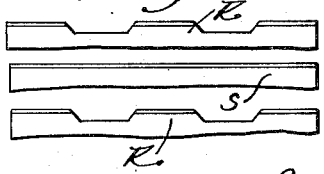
Figure 11A:
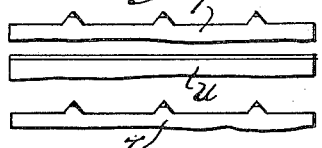

Figure 11 indicates a grouping of knife elements adapted to manufacture flakes of the type shown in Figure 7;

Figure 11A shows another grouping of knife elements which may also be used to manufacture flakes of the type shown in Figure 7;

Figure 12 is a fragmentary view of the surface of a composite fibrous structure, made of wafers having their end edges perpendicular to the sides, and Figure 13 is a fragmentary view of a composite fibrous structure made with wafers having end edges at an oblique angle with the sides.

In accordance with this invention, wafers or flakes are cut from a wooden block by cutting into the block of wood parallel to the length of fibers in the wood preferably by feeding the block of wood towards a moving cutting edge substantially perpendicularly to its path and with a cutting movement transverse said length to form wafers having a thickness corresponding to the depth of cut by scoring the wood with angular cuts in the direction of cutting movement. For this purpose, wafers or flakes are cut from a wooden block by knife elements which are arranged substantially parallel to the length of the fibers during cutting operations to form the broad faces while the end faces are severed at acute angles with the broad faces to impart the desired taper and flexibility to the ends for the purpose of enabling the manufacture of a strong, smooth-faced consolidated product. By feeding the block perpendicularly to the path of the cutting edge the wafers or flakes produced will have parallel broad faces.

As shown in Figures 8 and 9, a succession of wooden blocks 20 having at least one end squared is positioned on two endless chains 21 with the squared end 22 abutting the side wall 23. Each conveyor chain 21 is endless and passes over an idler sprocket 25 at one end and a drive sprocket 24 at the other, the latter of which is driven through a friction clutch 26 by a variable speed motor 27. Dogs 28 spaced along the length of the chain 21 function in a manner to advance the wooden blocks 20 past a circular saw member 29 which severs the block to predetermined length so as to enable further passage with the chains between side walls 23 and 30.

A pair of horizontally disposed downwardly inclined disk members 31 having serrated or toothed edges 32 extend through a slot in the side wall members 23 and 30 beyond the idler sprocket 25 so as to compress and grip the ends of the block 20 therebetween as it is fed to them by the chain 21 and advance them toward a cutting drum 33. The disk members 31, rotated by a variable speed driving motor 34, take over the feed of the wooden block toward the cutting knives 35 peripherally arranged about the cutting drum 33.

With the feed wheels or disks 31 located immediately in advance of the cutting wheel 33 and in constant engagement with the wooden block while it is being cut and, with the downward slant of the disk, a steady feed rate of variable speed is secured without chatter or excessive vibration which would otherwise occur if the feeding of the block were performed by the dogs on the belt. The downward slant of the disks ensures that the block is kept firmly pressed against the bed plate 36, because the teeth in the disks thereby bite downwardly as well as inwardly, as the blocks are fed forward.

The cutting drum 33 is rotatably mounted on the shaft 36' which is adapted to be driven at variable speed from a power source (not shown). A plurality of knife elements 35 are substantially equidistantly arranged about the periphery of the wheel with the cutting edges extending from the surface thereof to effect severance of the block into wafers or slivers of the type which will hereinafter be described. By the proper selection and arrangement of knife elements, it has been found possible to sever wafers of predetermined contour in a single operation by the cutting drum 33.

Figure 10:
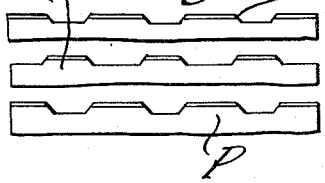
Figure 10 shows a grouping of knife elements which may be used in the manufacture of wafers of the type shown in Figure 6.

In the modification shown in Figure 10, the alternate rows of knife elements are formed with cutting edges Q having a length less than 5 inches and spaced laterally one from the other in the cutting element by a distance corresponding to the length of the cutting edges. The end corners of the cutting edges Q are sloped laterally from the outer end of the cutting edges to the base. The cutting elements in between are formed with cutting edges P dimensioned to correspond to the cutting edges Q but arranged to extend across the space left vacant by the cutting edges Q in the preceding cutting element. The end corners of the cutting edges P are also similarly tapered out laterally from the cutting edge to the base.

In operation, the cutting edges Q, which come into contact with the block of wood, operate more or less to route out wafers from the wooden block having a length, when measured in the grain direction, corresponding to the length of the cutting edge and a thickness corresponding to the depth of cut. The ends of the wafers will be tapered more or less corresponding with the slope at the end corners of the cutting edges. The cutting edges leave grooves in the face of the wooden block spaced one from the other by a distance corresponding to the spaced relation between the cutting edges Q. The cutting edges P of the oncoming cutting element level the face of the block by cutting to an equivalent distance into the block thereby to sever the raised portions and form wafers dimensioned to have a length corresponding to the length of the cutting edges and a thickness corresponding to the depth of cut. When the corners of both sets of blades Q and P are tapered as described, wafers of the type shown in Figure 6 will be produced.

In the modification shown in Figure 11, alternate cutting elements are used with one group having cutting edges R corresponding to the cutting edges Q of the previously described modification. The alternate cutting elements in between comprise blades having cutting edges S extending continuously across the drum.

In operation, the cutting edges R cut into the face of the wooden block to route out wafers having a length in the grain direction corresponding to the length of the cutting edges and a thickness corresponding to the depth of cut. The ends of the wafers in the grain direction are tapered to correspond with the slope at the end corners of the cutting edges. The oncoming cutting element S cuts to the same depth as the previous cutting edges R thereby to shave off material that is left in the face of the wooden block between the edges R of the previous cutting element.

When an arrangement of the type described in Figure 11 is employed, wafers of the type shown in Figure 7 of the drawings will be produced.

In the modification shown in Figure 11A, one set of cutting elements is formed with triangularly shaped cutting elements T spaced one from the other by a distance corresponding to the length of the wafers to be cut when measured in the grain direction. The triangular cutting elements T gouge out a triangularly shaped section from the face of the wooden block having a depth corresponding to the thickness of the wafers to be cut and with the apex of the groove in the center. The oncoming set of cutting elements is formed with cutting edges U extending continuously across the drum and arranged to cut to a depth corresponding to the gouged-out portion in the face of the wooden block thereby to cut wafers from the block having a thickness corresponding to the depth of cut and a length corresponding to the distance between the grooves. The wafers that are formed will have tapered ends, as illustrated in Figure 7 of the drawing.

The length of the wafers will correspond to the distance between the outwardly directed cutting edges or depressions in the knife elements while the width of the wafers will correspond to the thickness of the wooden block except for the splitting that normally occurs lengthwise along the grain which subdivides the wafer into widths usually an inch or less. The thickness of the wafer depends upon the linear rate of feed of the block as governed by the rotational movement of the disk members 31 and the peripheral speed of the cutting knives 35 which successively engage the block. Increasing the rate of feed of the block will correspondingly reduce the thickness of the wafers and vice versa. For use in the manufacture of dense molded boards and panels, as will hereinafter be pointed out, it is desirable to control the thickness of the wafers to within the range of 0.002–0.015 inch. While best use is made of wafers having lengths and widths within the range of 0.5–2.0 inches, wafers of greater length or width may be produced but not to exceed 5 inches because this is probably the upper limit of size which will permit the wafers to be felted satisfactorily.

Wafers or elements produced in accordance with this invention, exemplified in Figures 1 to 5, have wedge-shaped ends formed by end faces ABHG or CDFE, a controlled thickness DJ, length AD and width DC, the end faces making an acute angle DAG or DEG with the top and bottom faces ABCD or HFEG. The end faces DCFE and ABHG may be markedly curved if the edges of the sides of the depressions in the cutters shown in Figures 10, 11 and 11A are similarly curved.

In general, the side faces ADEG and BDFH will be neither flat nor exactly parallel to the length of the fibers because they will usually constitute fractured surfaces along natural striae as those between the annual rings in wood. However, either face may have been a part of the outer face of the billet of wood from which the wafer was cut. This absence of parallelism or regularity between the pairs of side faces of the majority of the wafers and the parallelism of each side face with the adjacent annual ring in the wood, serves in part to distinguish wafers made in accordance with this invention from others. For example, it is understood that thin decorative wafers have been sliced obliquely from the end of a stick of wood with the grain running the short way. In such a case, except for inadvertent fractures the end and side faces of the wafers so made will comprise parts of the four outer flat faces of the original stock of wood from which they were cut.

When the broad top and bottom surfaces of the wafers have been cut with a knife edge lying parallel to and moving across the direction of the fibers as herein described, the original strength of the fibrous elements in the woody structure is preserved almost intact. If, on the other hand, the cutting edge lies at an angle to or moves in other than a direction substantially perpendicular to the axial direction of the fibers, the resulting wafers, especially if cut from air dry wood, will be more or less checked or cracked across the grain, as is very evident with ordinary planer shavings. The direction in which the faces of fibers have been cut may be determined from microscopic observation, by seeing in which direction lie the scratches made by imperfections in the cutting edges and the direction in which microscopically small fibrous elements have bent while being cut.

Elements or wafers made in accordance with this invention, having a thickness of upwards of 0.002 inch, from 1.0 to 2.0 inches long and of various widths, are particularly suitable for use in preparing a composite molded fibrous structure. This is preferably accomplished by dusting or mixing the wafers with a small percentage of finely powdered thermoactive resin, such as phenol formaldehyde, urea formaldehyde, melamine formaldehyde and the like curable thermosetting resins in an intermediate stage of polymeric growth, and felting the resulting resinous coated wafers into a mat, such as described in my copending application Ser. No. 110,212, filed August 13, 1949, now Patent No. 2,698,271. The desired resinous concentration in uniform distribution on the surfaces of the wafers can also be accomplished by treating the fibrous elements with resinous solution and dispersion and drying before felting or by the addition of such bonding agents in combination with the felting operation. When using dry powdered resin with wafers of the type described, it has been found that from 2–4 percent resin will produce molded boards having strength properties which are considerably greater than that heretofore secured with 10–40 percent by weight resin added to conventional fine wood fibers or to sawdust. The amount of resin required for molding into a composite board is dependent upon the thickness of wafers and the density of the wood of which they are formed but with the thicker wafers more than 3 percent by weight resin is seldom if ever required. It is believed more accurate to define the resin concentration in relation to the amount present per unit area of fiber surface because of the variation in proportion to the thickness and the density of the wafer. Under such circumstance it has been found that amounts within the range of $\frac{1}{10}$–1 pound dry resin per 1000 square feet of surface area is sufficient for consolidation to produce boards, which is only a small fraction of the amount heretofore required to produce a molded board of comparable strength with materials of the prior art. Further increases in the amount of resin are not necessary because it does not proportionately increase the strength of the molded product.

By way of example, wafers about 0.015 inch thick made in accordance with this invention from a moderately hard wood like Douglas Fir are dusted with 3 percent by weight of phenolic resin (minus 200 mesh) (about 0.52 pound per 1,000 square feet of surface area). The resinous coated wafers are felted into a mat and consolidated under pressure of 500 p. s. i. for 5 minutes at 320° F. A ¼ inch board having a density of 1.0 and a modulus of rupture of over 7,000 p. s. i. is obtained. If a polished caul is used during the consolidation of molding of the board, the face of the board formed against it is characterized further by having a smooth, glossy surface unmarred by linear depressions at the ends of the wafers. The board is further characterized by substantially all of the visible wafers having their side edges parallel to the grain of the wood, as shown in the fibers in Figures 3 and 5 and by the fragmentary plan views of the boards in Figures 12 and 13.

If the knives cutting the wafers to length are dull, the end edges of the wafers will be ragged. This ragged or scalloped effect of the end edges is often achieved when the surface lamina of a structure composed of wafers having sharp straight end edges, is sanded. Removal of the surface by sanding, of course, removes also the resinous glossy surface.

Particularly when the wafers are cut from hard wood or wood having dense summer wood rings, wafers having ends tapered in thickness give a stronger and considerably smoother surfaced board than do wafers having blunt ends. Furthermore, this tapering of the ends permits a thicker wafer to be used than if the ends were not tapered. In consequence, the specific surface of the fibrous material is reduced and with this proportionately the quantity of resinous binder necessary to make a board having a required strength.

The use of a single cutting drum having knives of the type illustrated by Figures 10 and 11 provides fibers which are immediately cut to desired contour in a one-step operation.

By permitting the knives on the sliver cutters to protrude only a little more from the face of the cutter than the thickness of the slivers to be cut, when the side end of a billet of wood is reached, there is comparatively little disturbance to the cutting. By positively feeding the billets of wood to the cutter as close as possible to it as herein disclosed, not only is the thickness of unsupported side ends of the billets reduced to a minimum, but the absence of the springiness between the cutter and the feeding means of a comparatively long length of wood or pieces of wood, markedly improves the uniformity of thickness of the slivers and their smoothness of surface. Both these improvements result in an appreciable reduction in the quantity of resin and sizing necessary for making a structure of a required strength and resistance to liquids.

It is to be understood that the apparatus shown and described is to be taken as exemplary only of the method disclosed for producing an improved wafer of high quality and at a comparatively low cost from pieces of woody material that otherwise might be of little value.

It will be further understood that numerous changes may be made in the details of construction, arrangement and operation of the apparatus without departing from the spirit of the invention, especially as defined in the following claims.

I claim:

1. The method of producing fibrous wafers of the type described, comprising the combination of steps of cutting a block of wood parallel to the lengths of the fibers in the wood with a first cutting movement transverse said lengths to produce slots in the face of the wood spaced apart in the direction of the lengths of the fibers by an amount corresponding to the lengths of the wafers subsequently to be cut from the block of wood, the sides of said slots being sloped inwardly by cutting in said first cutting movement at an angle in the edges of said slots, and cutting the block of wood parallel to the lengths of the fibers in the wood with a second cutting movement transverse said lengths and at a depth corresponding to the depth of the slots to sever the portions in the face of the wooden block between said slots to form tapered end wafers having a thickness corresponding to the depth of cut and lengths corresponding to the spaced relation between the slots.

2. The method of producing fibrous wafers of the type described, comprising the combination of steps of cutting a block of wood parallel to the lengths of the fibers in the wood with a first cutting movement transverse said lengths in transversely spaced-apart portions in said block of wood and in an angular relation at the lateral edges to produce tapered end wafers having lengths in the fiber direction corresponding to the depth of cut with tapered end sections leaving flat slots in laterally spaced-apart portions in the block of wood dimensioned to have a width corresponding to the lengths of the wafers that are cut and sloping sides corresponding to the taper in the ends of the wafers, and cutting the block of wood parallel to the lengths of the fibers in the wood with a second cutting movement transverse said lengths to sever material between the slots from the face of the block of wood to form wafers having tapered ends and dimensioned to have lengths in the fiber directions corresponding to the spaced relation between the slots.

3. The method of producing fibrous wafers as claimed in claim 2 in which the slots have a width less than 5 inches but greater than 0.5 inch to form wafers in the first cutting movement dimensioned to have lengths in the fiber directions corresponding to the width of the slots.

4. The method of producing fibrous wafers as claimed in claim 2 in which the spaced relation between the slots is less than 5 inches but greater than 0.5 inch to form wafers by the second cutting movement having lengths in the fiber direction of corresponding dimension.

5. The method as claimed in claim 2 in which the wooden block is advanced substantially perpendicularly to the direction of cutting movement whereby wafers are cut with substantially parallel broad faces.

References Cited in the file of this patent

UNITED STATES PATENTS 2,751,947   Wyss _____ June 26, 1956